Figure 1:
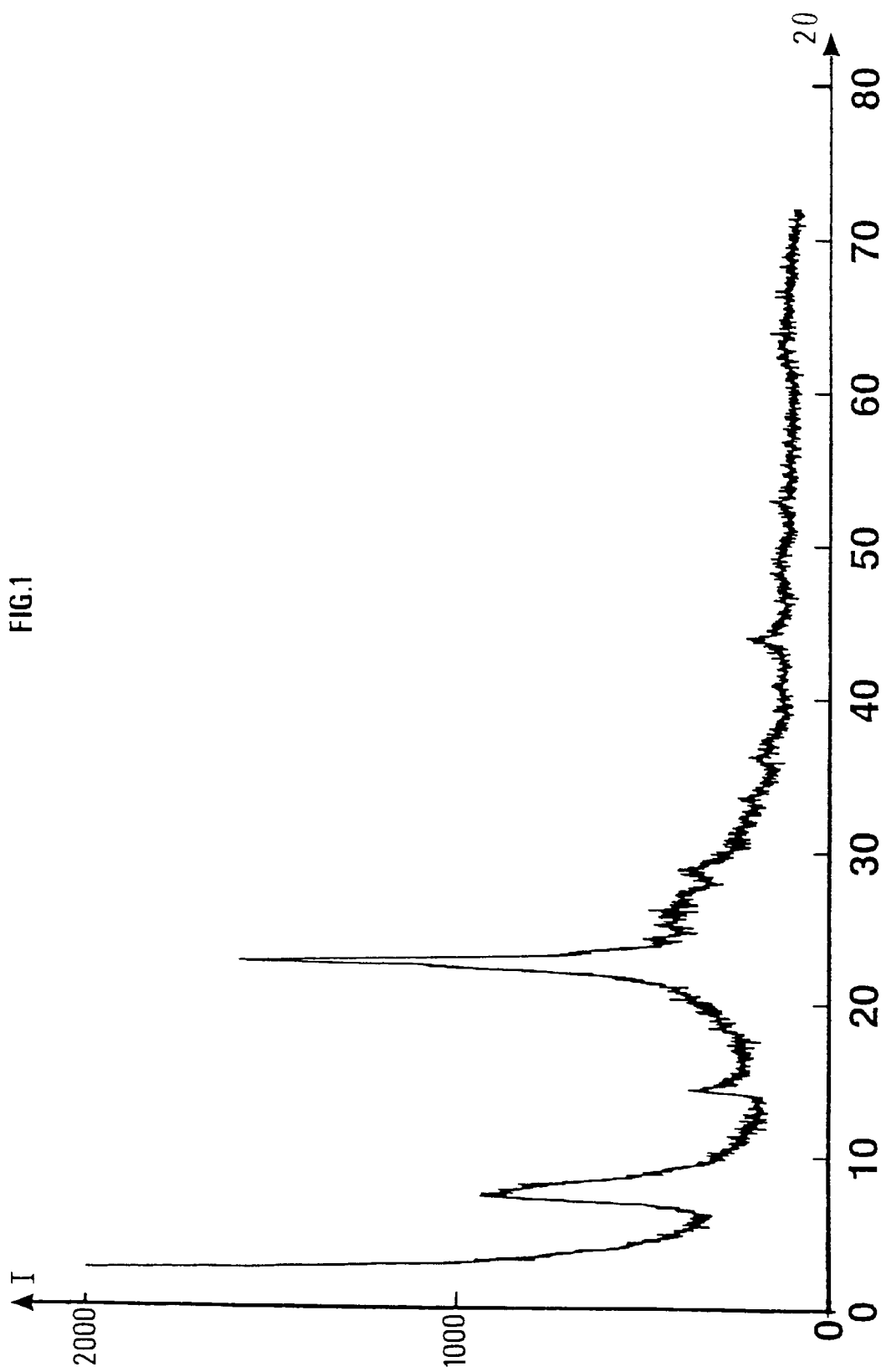

United States Patent [19]

Benazzi et al.

[11] Patent Number: 6,136,180

[45] Date of Patent: *Oct. 24, 2000

[54] CATALYST COMPRISING A NU-88 ZEOLITE, A GROUP VB ELEMENT AND ITS USE FOR HYDROCONVERTING HYDROCARBON-CONTAINING PETROLEUM FEEDS

[75] Inventors: Eric Benazzi, Chatou; Nathalie Marchal-George, Saint Genies Laval; Fabrice Diehl; Slavik Kasztelan, both of Rueil Malmaison, all of France

[73] Assignee: Institut Francais du Petrole, France

[ * ] Notice: This patent is subject to a terminal disclaimer.

[21] Appl. No.: 09/253,011

[22] Filed: Feb. 19, 1999

[30] Foreign Application Priority Data

Feb. 2, 1998 [FR] France ................................. 98 02102

[51] Int. Cl.$^7$ .................................................. C01G 11/04
[52] U.S. Cl. ............................ 208/122; 208/124; 502/60; 502/64
[58] Field of Search ...................... 502/60, 64; 585/419, 585/273, 481, 482, 467, 721, 520, 531, 653, 660, 739, 666; 208/122, 124

[56] References Cited

U.S. PATENT DOCUMENTS 4,557,919  12/1985  Sumitani et al. .

FOREIGN PATENT DOCUMENTS 135658  4/1984  European Pat. Off. .
27 09 498  10/1977  Germany .

*Primary Examiner*—Tom Dunn
*Attorney, Agent, or Firm*—Millen, White, Zelano & Branigan, P.C.

[57] ABSTRACT

The invention provides a hydrocracking catalyst comprising at least one NU-88 zeolite, at least one group VB metal, preferably niobium, at least one amorphous or low crystallinity matrix, optionally at least one metal selected from the group formed by group VIB and VIII metals, optionally at least one element selected from the group formed by phosphorous, boron and silicon, and optionally at least one group VIIA element. The invention also relates to the use of the catalyst for hydrocracking hydrocarbon-containing feeds.

33 Claims, 2 Drawing Sheets

CATALYST COMPRISING A NU-88 ZEOLITE, A GROUP VB ELEMENT AND ITS USE FOR HYDROCONVERTING HYDROCARBON-CONTAINING PETROLEUM FEEDS

SUMMARY OF THE INVENTION

The present invention relates to a catalyst for hydrocracking hydrocarbon-containing feeds, said catalyst comprising at least one NU-88 zeolite, a group VB metal, preferably niobium, at least one amorphous or low crystallinity oxide type matrix, optionally at least one metal selected from group VIB and VIII of the periodic table, preferably molybdenum or tungsten, cobalt, nickel or iron. The catalyst matrix optionally contains an element selected from the group formed by phosphorous, boron and silicon, and optionally at least one group VIIA element (group 17, the halogens), such as fluorine.

The present invention also relates to processes for preparing said catalyst, and to its use for hydrocracking hydrocarbon-containing feeds such as petroleum cuts, or cuts from coal containing aromatic and/or olefinic and/or naphthenic and/or paraffinic compounds, said feeds possibly containing metals and/or nitrogen and/or oxygen and/or sulphur.

Hydrocracking heavy petroleum feeds is a very important refining process which produces lighter fractions such as gasoline, jet fuel and light gas oil from surplus heavy feeds which are of low intrinsic value, which lighter fractions are needed by the refiner so that he can match production to demand. Certain hydrocracking processes can also produce a highly purified residue which can constitute excellent bases for oils. The importance of catalytic hydrocracking over catalytic cracking is that it can provide very good quality middle distillates, jet fuels and gas oils. The gasoline produced has a much lower octane number than that from catalytic cracking.

All catalysts used for hydrocracking are bifunctional, combining an acid function and a hydrogenating function. The acid function is supplied by large surface area supports (150 to 800 m$^2$/g in general) with a superficial acidity, such as halogenated aluminas (in particular fluorinated or chlorinated), combinations of boron and aluminium oxides, amorphous silica-aluminas and zeolites. The hydrogenating function is supplied either by one or more metals from group VIII of the periodic table, such as iron, cobalt, nickel, ruthenium, rhodium, palladium, osmium, iridium or platinum, or by a combination of at least one metal from group VI of the periodic table and at least one group VIII metal.

The equilibrium between the two, acid and hydrogenating, functions is the fundamental parameter which governs the activity and selectivity of the catalyst. A weak acid function and a strong hydrogenating function produces low activity catalysts which generally operate at a high temperature (390° C. or above), and at a low supply space velocity (HSV, expressed as the volume of feed to be treated per unit volume of catalyst per hour, and is generally 2 h$^{-1}$ or less), but have very good selectivity for middle distillates. In contrast, a strong acid function and a weak hydrogenating function produces active catalysts but selectivities for middle distillates are poorer. The search for a suitable catalyst is thus centred on the proper choice of each of the functions to adjust the activity/selectivity balance of the catalyst.

One of the main points of hydrocracking is to exhibit high flexibility at various levels: flexibility in the catalysts used, which results in flexibility in the feeds to be treated and in the products obtained. One parameter which is easy to control is the acidity of the catalyst support.

The vast majority of conventional catalytic hydrocracking catalysts are constituted by weakly acidic supports such as amorphous silica-aluminas. More particularly, such systems are used to produce very good quality middle distillates and, when their acidity is very low, oil bases.

Weakly acid supports include amorphous silica-aluminas. Many catalysts on the hydrocracking market are based on silica-alumina combined either with a group VIII metal or, as is preferable when the amount of heteroatomic poisons in the feed to be treated exceeds 0.5% by weight, a combination of sulphides of groups VIB and VIII metals. The selectivity of such systems for middle distillates is very good, and the products formed are of high quality. The least acidic of such catalysts can also produce lubricating bases. The disadvantage of all such amorphous support-based catalytic systems is, as already stated, their low activity.

The catalytic activity of catalysts comprising for example Y zeolite with structure type FAU or catalysts comprising for example a beta type zeolite is higher than that of amorphous silica-aluminas, but selectivities for light products are higher.

Further, simple sulphides of group VB elements have been described as constituents of catalysts for hydrorefining hydrocarbon-containing feeds, for example niobium trisulphide described in United States patent U.S. Pat. No. 5,294,333. Mixtures of simple sulphides comprising at least one group VB element and a group VIB element have also been tested as constituents for catalysts for hydrorefining hydrocarbon-containing feeds, as for example in U.S. Pat. No. 4,910,181 and U.S. Pat. No. 5,275,994.

Research carried out by the Applicant on a number of zeolites and crystalline microporous solids have led to the discovery that, surprisingly, a catalyst for hydrocracking hydrocarbon-containing feeds characterized in that it comprises at least one NU-88 zeolite, at least one amorphous or low crystallinity mineral matrix, which is generally porous, such as alumina, at least one element from group VB of the periodic table, such as tantalum, niobium or vanadium, preferably niobium, optionally at least one element from group VIB of that periodic table, such as chromium, molybdenum or tungsten, preferably molybdenum or tungsten, more preferably molybdenum, optionally a group VIII element, i.e., an element selected from the group formed by: Fe, Ru, Os, Co, Rh, Ir, Ni, Pd, Pt, preferably iron, cobalt or nickel, optionally an element selected from the group formed by P, B and Si, and optionally a group VIIA element, preferably fluorine, can produce activities, i.e., a degree of conversion, which are higher than those of known prior art catalysts.

The catalyst has a higher hydrocracking activity than those of prior art catalytic formulae based on group VIB elements. Without wishing to be bound to a particular theory, it appears that this particularly high activity of the catalysts of the present invention is due to the particular properties of the sulphide of the group VB element. The presence of such a sulphide with acidic properties not only improves the cracking properties but also improves the hydrogenating, hydrodesulphuration, and hydrodenitrogenation properties over those of a group VIB element sulphide and in particular a molybdenum or tungsten sulphide normally used for the hydrogenating function.

The catalyst of the present invention generally comprises, in weight % with respect to the total catalyst weight:
0.1% to 99.8%, preferably 0.1% to 90%, more preferably 0.1% to 80%, and particularly preferably 0.1% to 70%, of a NU-88 zeolite;
0.1% to 60%, preferably 0.1% to 50%, more preferably 0.1% to 40%, of at least one metal selected from group VB;
0.1% to 99%, preferably 1% to 99%, of an amorphous or low crystallinity oxide type porous mineral matrix;
said catalyst being characterized in that it optionally comprises:
0 to 60%, preferably 0.1% to 50%, more preferably 0.1% to 40%, of at least one metal selected from group VIII and group VIB elements;
0 to 20%, preferably 0.1% to 15%, more preferably 0.1% to 10%, of at least one promoter element selected from the group formed by silicon, boron and phosphorous, not including the silicon possibly contained in the zeolite framework;
and optionally again:
0 to 20%, preferably 0.1% to 15%, more preferably 0.1% to 10%, of at least one element selected from group VIIA, preferably fluorine.

When it is present, the promoter element silicon is in its amorphous form and mainly located on the matrix.

The group VB, group VIB and group VIII metals in the catalyst of the present invention can be completely or partially present in the form of the metal and/or oxide and/or sulphide.

The catalysts of the invention can be prepared using any of the methods known to the skilled person.

A preferred method for preparing the catalyst of the present invention comprises the following steps:

a) drying and weighing a solid termed the precursor, comprising at least the following compounds: at least one matrix, at least one NJ-88 zeolite, optionally at least one element selected from the group formed by group VIB and group VIII elements, optionally at least one element selected from the group phosphorous, boron and silicon, and optionally at least one group VIIA element, the whole preferably having been formed;

b) calcining the dry solid obtained in step a) at a temperature of at least 150° C.;

c) impregnating the solid precursor defined in step b) with a solution containing a group VB element, preferably niobium;

d) leaving the moist solid in a moist atmosphere at a temperature in the range 10° C. to 120° C.;

e) drying the moist solid obtained in step d) at a temperature in the range 60° C. to 150° C.

The precursor of step a) above can be produced using any of the conventional methods available to the skilled person. In a further preferred preparation method, the precursor is obtained by mixing at least one matrix and at least one NU-88 zeolite then forming, drying and calcining. The group VIB, VIII elements and those selected from phosphorous, boron, silicon and group VIIA elements are then optionally introduced using any method which is available to the skilled person, in any one of steps a) to e), before or after forming and before or after calcining the precursor or the catalyst.

Forming can be carried out by extrusion, pelletization, by the oil drop method, by rotating plate granulation or using any other method which is well known to the skilled person. At least one calcining step can be carried out after any one of the preparation steps; it is normally carried out in air at a temperature of at least 150° C., preferably at least 300° C. Thus the product obtained after step a) and/or step e) and/or optionally after introducing the element or elements from groups VIB, VIII, those selected from phosphorous, boron, silicon, and the group VIIA elements, are optionally calcined in air, usually at a temperature of at least 150° C., preferably at least 250° C., routinely about 350° C. to 1000° C.

The hydrogenating element can be introduced at any step in the preparation, preferably during mixing, or more preferably after forming. Forming is followed by calcining; the hydrogenating element can also be introduced before or after calcining. Preparation is generally completed by calcining at a temperature of 250° C. to 600° C. A further preferred method consists of mixing at least one NU-88 zeolite powder in a moist alumina gel for a few tens of minutes, then passing the paste obtained through a die to form extrudates with a diameter in the range 0.4 to 4 mm. The hydrogenating function can then be introduced only partially (in the case, for example of combinations of oxides of groups VIB and VIII metals) or completely on mixing the zeolite, i.e., at least one NU-88 zeolite, with at least one gel of the oxide selected as the matrix. It can also be introduced by one or more ion exchange operations carried out on the calcined support constituted by at least one NU-88 zeolite dispersed in at least one matrix, using solutions containing precursor salts of the selected metals when these are from group VIII. It can also be introduced by one or more steps for impregnating the formed and calcined support using a solution of precursors of group VIII metal oxides (in particular cobalt or nickel) when the precursors of the group VIB metal oxides (in particular molybdenum or tungsten) have already been introduced on mixing the support. Finally, it can also be introduced by one or more steps for impregnating the calcined support constituted by at least one NU-88 zeolite and at least one matrix, using solutions containing precursors of oxides of group VI and/or group VIII metals, the precursors of the oxides of at least one group VIII metal preferably being introduced after those of group VIB or at the same time as the latter.

The support is preferably impregnated using an aqueous solution. The support is preferably impregnated using the "dry" impregnation method which is well known to the skilled person. Impregnation can be carried out in a single step using a solution containing all of the constituent elements of the final catalyst.

The boron and/or silicon and/or phosphorous and optionally the element selected from group VIIA, preferably fluorine, can be introduced onto the catalyst at any stage in the preparation and using any technique known to the skilled person.

One preferred method of the invention consists of depositing the selected promoter elements, for example a boron-silicon combination, onto the calcined or non calcined precursor (preferably calcined). To this end, an aqueous solution of at least one boron salt such as ammonium biborate or ammonium pentaborate is prepared in an alkaline medium and in the presence of hydrogen peroxide and dry impregnation is carried out, in which the pore volume of the precursor is filled with the solution containing boron, for example. When silicon is also deposited, for example, a silicone type silicon compound can be used.

Boron and silicon can also be deposited simultaneously using a solution containing a boron salt and a silicone type silicon compound, for example. Thus, in the case where the precursor is a nickel-molybdenum type catalyst supported on alumina and NU-88, for example, it is possible to impregnate this precursor with an aqueous solution of ammonium biborate or Rhodorsil E1P silicone from Rhône Poulenc, dry at 80° C., for example, impregnate with an ammonium fluoride solution, then dry at 80° C., for example, followed by calcining, preferably in air in a traversed bed, for example at 500° C. for 4 hours. The group VB element is then deposited using any method which is known to the skilled person.

The promoter element selected from the group formed by silicon, boron and phosphorous and the element selected from group VIIA halide ions can be introduced onto the calcined precursor using one or more impregnation operations using an excess of solution.

Thus, for example, it is possible to impregnate this precursor with an aqueous solution of ammonium biborate or Rhodorsil E1P silicone from Rhone Poulenc, dry at 80° C., for example, impregnate with an ammonium fluoride solution, then dry at 80° C., for example, followed by calcining, preferably in air in a traversed bed, for example at 500° C. for 4 hours. The group VB element is then deposited using any method which is known to the skilled person.

Other impregnation sequences can be used to obtain the catalyst of the invention.

As an example, the precursor can be impregnated with a solution containing the promoter elements (P, B, Si), dried, calcined then the solid obtained can be impregnated with a solution containing a further promoter element, dried, then calcined. The precursor can also be impregnated with a solution containing two promoter elements, dried, calcined then the solid obtained can be impregnated with a solution containing a further promoter element, dried, then a final calcining step can be carried out. The group VB element is then deposited using any method which is known to the skilled person.

The catalyst of the present invention can optionally comprise a group VIII element such as iron, cobalt, nickel, ruthenium, rhodium, palladium, osmium, iridium or platinum. Preferred group VIII metals are those selected from the group formed by iron, cobalt, nickel and ruthenium. Advantageously, the following combinations of metals are used: nickel-niobium-molybdenum, cobalt-niobium-molybdenum, iron-niobium-molybdenum, nickel-niobium-tungsten, cobalt-niobium-tungsten, iron-niobium-tungsten. Preferred combinations are: nickel-niobium-molybdenum, cobalt-niobium-molybdenum. It is also possible to use combinations of four metals, for example nickel-cobalt-niobium-molybdenum. Combinations containing a noble metal, such as ruthenium-niobium-molybdenum, or ruthenium-nickel-niobium-molybdenum, can also be used.

When the elements are introduced in a plurality of impregnation steps using the corresponding precursor salts, an intermediate catalyst calcining step must be carried out at a temperature which is preferably in the range 250° C. to 600° C., for example.

Molybdenum impregnation can be facilitated by adding phosphoric acid to ammonium paramolybdate solutions, which enables phosphorous to be introduced as well to promote the catalytic activity. Other phosphorous compounds can be used, as is well known to the skilled person.

Niobium impregnation can be facilitated by adding oxalic acid and optionally ammonium oxalate to niobium oxalate solutions. Other compounds can be used to improve solubility and facilitate niobium impregnation, as is well known to the skilled person.

Sulphurisation of solids (catalysts) containing at least one group VB element in its oxide form has proved to be very difficult in the majority of conventional sulphurisation methods known to the skilled person. Catalysts containing at least one group VB element supported on an alumina type matrix are known to be very difficult to sulphurise once the combination of the group VB element and alumina has been calined at a temperature of over 200° C.

Sulphurisation can take place using any method known to the skilled person and at any stage of the preparation. The preferred method of the invention consists of heating the non calcined catalyst in a stream of a hydrogen-hydrogen sulphide mixture or in a stream of a nitrogen-hydrogen sulphide mixture or in a stream of pure hydrogen sulphide at a temperature in the range 150° C. to 800° C., preferably 250° C. to 600° C., generally in a traversed bed reaction zone. Thus, in the preferred case when the group VB metal is niobium and the group VIB metal is molybdenum, it is possible to impregnate the support, for example the alumina-NU-88 mixture, using ammonium heptamolybdate, dry at 80° C., then impregnate using niobium oxalate, dry at 80° C., then sulphurise, for example and as is preferred, using $H_2S$ in a traversed bed, for example at 500° C. for 10 hours.

The NU-88 zeolite used in the present invention is characterized by:

i) a chemical composition with the following formula, expressed in terms of the mole ratios of the oxides for the anhydrous state:

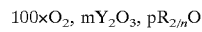

$$100xO_2, mY_2O_3, pR_{2/n}O$$

where m is 10 or less; p is 20 or less; R represents one or more cations with valency n; X represents silicon and/or germanium, preferably silicon; Y is selected from the group formed by the following elements: aluminium, iron, gallium, boron, titanium, vanadium, zirconium, molybdenum, arsenic, antimony, chromium and manganese, Y preferably being aluminium; and ii) an X ray diffraction diagram, in its as synthesised state, which comprises the results shown in Table 1.

TABLE 1

X ray diffraction diagram for NU-88 zeolite (as synthesised state)

| $d_{hkl}$ ($10^{-10}$ m) | $I/I_{max}$ |
|---|---|
| 12.1 ± 0.35 | s or vs (1) |
| 11.0 ± 0.30 | s (1) |
| 9.88 ± 0.25 | m (1) |
| 6.17 ± 0.15 | w |
| 3.97 ± 0.09 | vs (2) |
| 3.90 ± 0.08 | vs (2) |
| 3.80 ± 0.08 | w (2) |
| 3.66 ± 0.07 | vw |
| 3.52 ± 0.07 | vw |
| 3.27 ± 0.07 | vw |
| 3.09 ± 0.06 | w |
| 2.91 ± 0.06 | w |
| 2.68 ± 0.06 | vw |
| 2.49 ± 0.05 | vw |
| 2.20 ± 0.05 | vw |
| 2.059 ± 0.05 | w |
| 1.729 ± 0.04 | vw |

(1) These peaks were not resolved and formed part of a feature.
(2) these peaks were not resolved and formed part of the same feature.

The invention also concerns NU-88 in its hydrogen form, termed H-NU-88, produced by calcining and/or ion exchange as will be described below. H-NU-88 zeolite has an X ray diffraction diagram which comprises the results shown in Table 2.

TABLE 2

X ray diffraction diagram for NU-88 zeolite (hydrogen form)

| $d_{hkl}$ ($10^{-10}$ m) | $I/I_{max}$ |
|---|---|
| 12.1 ± 0.35 | vs (1) |
| 11.0 ± 0.30 | s or vs (1) |
| 9.92 ± 0.25 | w or m (1) |
| 8.83 ± 0.20 | vw |
| 6.17 ± 0.15 | w |
| 3.99 ± 0.10 | s or vs (2) |
| 3.91 ± 0.08 | vs (2) |
| 3.79 ± 0.08 | w or m (2) |
| 3.67 ± 0.07 | vw |
| 3.52 ± 0.07 | vw |
| 3.09 ± 0.06 | w |
| 2.90 ± 0.06 | w |
| 2.48 ± 0.05 | w |
| 2.065 ± 0.05 | w |
| 1.885 ± 0.04 | vw |
| 1.733 ± 0.04 | vw |

(1) These peaks were not resolved and formed part of a feature.
(2) these peaks were not resolved and formed part of the same feature.

These diagrams were obtained using a diffractometer and a conventional powder method utilising the $K_\alpha$ line of copper, Cu K alpha. From the position of the diffraction peaks represented by the angle 2θ, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 10;
weak (w) means less than 20;
medium (m) means in the range 20 to 40;
strong (s) means in the range 40 to 60;
very strong (vs) means more than 60.

The X ray diffractograms from which the data are obtained (spacing d and relative intensities) are characterized by large reflections with a large number of peaks forming shoulders on other peaks of higher intensity. Some or all of the shoulders may not be resolved. This may be the case for samples with low crystallinity or for samples with crystals which are small enough to produce significant broadening of the X rays. This can also be the case when the equipment or operating conditions used to produce the diagram differ from those used in the present case.

NU-88 zeolite is considered to have a novel basic structure or topology which is characterized by its X ray diffraction diagram. NU-88 zeolite in its "as synthesised state" has substantially the X ray diffraction characteristics shown in Table 1, and is thus distinguished from prior art zeolites. The invention also concerns any zeolite with the same structural type as that of NU-88 zeolite.

Figure 2:
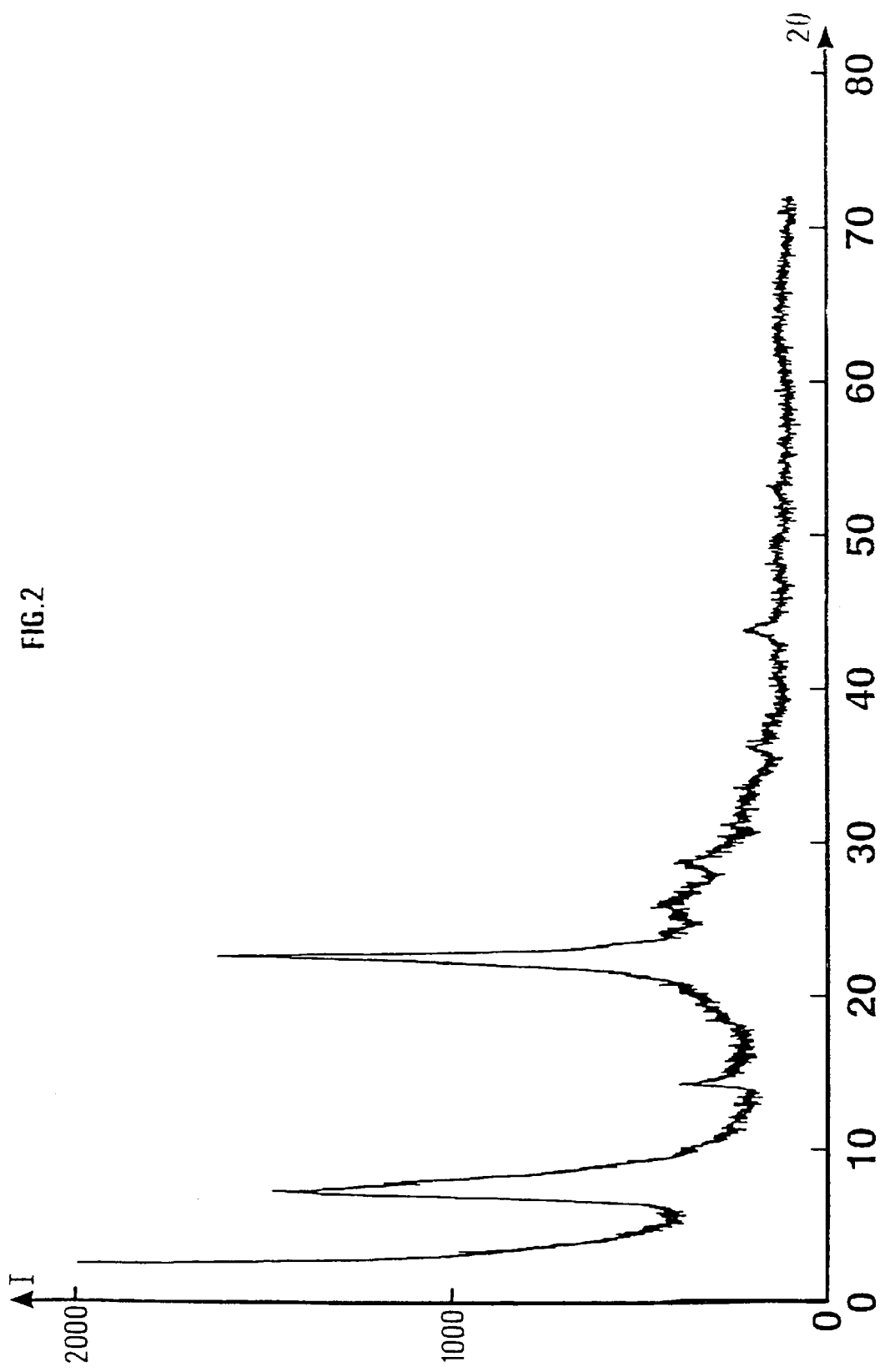

Tables 1 and 2 and the diffractograms of FIGS. 1 and 2 are relatively unusual for zeolitic structures. Thus these data appear to indicate that NU-88 zeolite has a defective structure.

In the chemical composition defined above, m is generally in the range 0.1 to 10, preferably 0.2 to 9, and more preferably 0.6 to 8; it appears that NU-88 zeolite is generally and most readily obtained in a very pure form when m is in the range 0.6 to 8.

This definition also includes NU-88 zeolite in its "as synthesised state", as well as the forms obtained on dehydration and/or calcining and/or ion exchange. The term "in its as synthesised state" designates the product obtained by synthesis and washing, with or without drying or dehydration. In its "as synthesised state", NU-88 zeolite may contain a cation of metal M, which is an alkali, in particular sodium, and/or ammonium, and it may contain organic nitrogen-containing cations such as those described below or their decomposition products, or precursors thereof. These organic nitrogen-containing cations are designated here by the letter Q, which also includes decomposition products and precursors of the organic nitrogen-containing cations.

Thus NU-88 zeolite in its "as synthesised state" (not calcined) is characterized by:

i) a chemical composition with the following formula, expressed in terms of the mole ratios of the oxides for the anhydrous state:

$$100 \times O_2 : 10 \text{ or less } Y_2O_3 : 10 \text{ or less } Q : 10 \text{ or less } M_2O,$$

where

X represents silicon and/or germanium;

Y is selected from the group formed by the following elements: aluminium, iron, gallium, boron, titanium, vanadium, zirconium, molybdenum, arsenic, antimony, chromium and manganese;

M is at least one alkali metal cation (group IA of the periodic table) and/or ammonium; and Q is at least one organic nitrogen-containing cation or a precursor of an organic nitrogen-containing cation or a decomposition product of an organic nitrogen-containing cation;

ii) an X ray diffraction diagram, in its as synthesised state, which comprises the results shown in Table 1.

The compositions indicated above for NU-88 zeolite are given for the anhydrous state, since the NU-88 zeolite in its "as synthesised state" and activated forms of the NU-88 zeolite, i.e., resulting from calcining and/or ion exchange, may contain water. The mole ratio of $H_2O$ of such forms, including NU-88 zeolite in its "as synthesised state", depends on the conditions under which it is prepared and stored after synthesis or activation. The molar quantities of water contained in these forms are typically in the range 0 to 100% $\times O_2$.

The calcined forms of NU-88 zeolite do not contain any organic nitrogen-containing compound, or contain a lesser quantity than the "as synthesised state", since the major portion of the organic substance has been eliminated, generally by heat treatment consisting of burning off the organic substance in the presence of air, the hydrogen ion ($H^+$) thus forming the other cation.

Thus the NU-88 zeolite in its hydrogen form is characterized by:

i) a chemical composition with the following formula, expressed in terms of the mole ratios of the oxides for the anhydrous state:

$$100 \times O_2 : 10 \text{ or less } Y_2O_3 : 10 \text{ or less } M_2O,$$

where

X represents silicon and/or germanium;

Y is selected from the group formed by the following elements: aluminium, iron, gallium, boron, titanium, vanadium, zirconium, molybdenum, arsenic, antimony, chromium and manganese; and M is at least one alkali metal cation (group IA of the periodic table) and/or ammonium and/or hydrogen;

ii) an X ray diffraction diagram, in its as synthesised state, which comprises the results shown in Table 2.

Of the NU-88 zeolite forms which can be obtained by ion exchange, the ammonium form ($NH_4^+$) is important as it can readily be converted into the hydrogen form by calcining. The hydrogen form and forms containing metals introduced by ion exchange will be described below. In some cases, the fact that the zeolite of the invention is subjected to the action of an acid can give rise to partial or complete elimination of a base element such as aluminium, as well as generation of the hydrogen form. This may constitute a means of modifying the composition of the substance after it has been synthesised.

NU-88 zeolite in its hydrogen form (acid form), termed H-NU-88, produced by calcining and ion exchange as will be described below.

NU-88 zeolite which is at least partially in its $H^+$ form (as defined above) or in its $NH_4^+$ form or in its metal form, said metal being selected from the group formed by groups IA, IB, IIA, IIB, IIIA, IIIB (including the rare earths), VIII, Sn, Pb and Si, preferably at least partially in its $H^+$ form or at least partially in its metal form, can also be used. This type of zeolite generally has an X ray diffraction diagram which includes the results shown in Table 1.

Preferably, the NU-88 zeolite is at least partially in its acid form (and preferably completely in its H form) or partially exchanged with metal cations, for example alkaline-earth metal cations.

The NU-88 zeolites which form part of the composition of the invention are used with the silicon and aluminium contents obtained on synthesis.

When the support comprises at least one matrix, the porous mineral matrix, which is normally amorphous or of low crystallinity, is generally constituted by at least one refractory oxide in its amorphous or low crystallinity form. Said matrix is preferably selected from the group formed by alumina, silica, silica-alumina or a mixture of at least two of the oxides cited above. Aluminates can also be used. Preferably, matrices containing alumina in any of its forms which are known to the skilled person are used, preferably gamma alumina.

Sources of the group VB element which can be used are well known to the skilled person. Examples of niobium sources are oxides such as diniobium pentoxide $Nb_2O_5$, niobic acid $Nb_2O_5.H_2O$, niobium hydroxides and polyoxoniobates, niobium alkoxides with formula $Nb(OR_1)_3$ where $R_1$ is an alkyl radical, niobium oxalate $NbO(HC_2O_4)_5$, and ammonium niobate. Preferably, niobium oxalate or ammonium niobate are used.

The sulphur source can be elemental sulphur, carbon disulphide, hydrogen sulphide, sulphur-containing hydrocarbons such as dimethyl sulphide, dimethyl disulphide, mercaptans, thiophene compounds, thiols, polysulphides such as ditertiononylpolysulphide or TPS-37 from ATOCHEM, sulphur-rich petroleum cuts such as gasoline, kerosine, gas oil, used alone or mixed with the sulphur-containing compounds cited above. The preferred sulphur source is carbon disulphide or hydrogen sulphide.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

A variety of silicon sources can be used. Examples are ethyl orthosilicate $Si(OEt)_4$, siloxanes, polysiloxanes, silicones, silicone emulsions and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can also be added, for example, by impregnation using a silicone type silicon compound suspended in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating an aqueous hydrofluoride solution or ammonium fluoride.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts. Preferably, oxides and ammonium salts are used, such as ammonium molybdate, ammonium heptamolybdate and ammonium tungstate.

The sources of the group VIII elements which can be used are well known to the skilled person. Examples of sources of non noble metals are nitrates, sulphates, phosphates, halides, for example chlorides, bromides and fluorides, and carboxylates, for example acetates and carbonates. Examples of sources of noble metals are halides, for example chlorides, nitrates, acids such as chloroplatinic acid, and oxychlorides such as ammoniacal ruthenium oxychloride.

The catalysts obtained in the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 $m^2/g$, the pore volume measured using a mercury porisimeter is in the range 0.2 to 1.5 $cm^3/g$ and the pore size distribution may be unimodal, bimodal or polymodal.

The catalysts obtained in the present invention are used for hydrocracking hydrocarbon feeds such as petroleum cuts. The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal or catalytic conversion processes, and their mixtures. They contain heteroatoms such as sulphur, oxygen and nitrogen and possibly metals.

The catalysts obtained are advantageously used for hydrocracking, in particular of vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The quantity of hydrogen is a minimum of 50 liters of hydrogen per liter of feed and usually in the range 80 to 5000 liters of hydrogen per liter of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C., preferably in the range 250° C. to 600° C., generally in a traversed bed reaction zone.

The catalyst of the present invention can advantageously be used for hydrocracking hydrocarbon-containing feeds, in particular vacuum distillate type cuts, more particularly cuts with a sulphur content of over 0.1% by weight and a nitrogen content of over 10 ppm.

In a first implementation, or partial hydrocracking, also known as mild hydrocracking, the degree of conversion is below 55%. The catalyst of the invention is thus used at a temperature which is generally 230° C. or more, preferably in the range 300° C. to 480° C., and usually in the range 350° C. to 450° C. The pressure is generally over 2 MPa and preferably 3 MPa, less than 12 MPa and preferably less than 10 MPa. The quantity of hydrogen is a minimum of 100 liters of hydrogen per liter of feed and usually in the range 200 to 3000 liters of hydrogen per liter of feed. The hourly space velocity is generally in the range 0.1 to 10 $h^{-1}$. Under these conditions, the catalysts of the present invention have better activities for conversion, hydrodesulphuration and hydrodenitrogenation than commercially available catalysts.

In a second implementation, the catalyst of the present invention can be used for partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step has a hydrotreatment function and comprises a matrix, preferably alumina-based, preferably containing no zeolite, and at least one metal with a hydrogenating function. Said matrix is an amorphous or low crystallinity oxide type porous mineral matrix. Non limiting examples are aluminas, silicas, and silica-aluminas. Aluminates can also be used. Preferably, matrices containing alumina are used, in any of the forms known to the skilled person, and more preferably aluminas, for example gamma aluminas, are used. The hydrotreatment function is ensured by at least one metal or metal compound from group VIII, such as nickel or cobalt. A combination of at least one metal or metal compound from group VIB (for example molybdenum or tungsten) and at least one metal or metal compound from group VIII (for example cobalt or nickel) can be used. The total concentration of groups VIB and VIII metal oxides is preferably in the range 5% to 40% by weight, most preferably in the range 7% to 30% by weight, and the weight ratio, expressed as the metal oxide of the group VIB metal (or metals) to that of the group VIII metal (or metals) is preferably in the range 1.25 to 20, more preferably in the range 2 to 10. Further, this catalyst can contain phosphorous. The phosphorous content, expressed as the concentration of phosphorous pentoxide $P_2O_5$ is preferably at most 15%, more preferably in the range 0.1% to 15% by weight, and very preferably in the range 0.15% to 10% by weight. It can also contain boron in a ratio B/P=1.05–2 (atomic), the sum of the B and P contents, expressed as the oxides, preferably being in the range 5% to 15% by weight.

The first step is generally carried out at a temperature of 350–460° C., preferably 360–450° C.; the pressure is at least 2 MPa, preferably at least 3 MPa; and the hourly space velocity is 0.1–5 $h^{-1}$, preferably 0.2–2 $h^{-1}$, with a quantity of hydrogen at least 100 liters of hydrogen per liter of feed, preferably 260–3000 liters of hydrogen per liter of feed.

In the conversion step using the catalyst of the invention (or second hydrocracking step), the temperatures are generally 230° C. or more and usually in the range 300° C. to 480° C., preferably in the range 330° C. to 450° C. The pressure is generally at least 2 MPa, preferably at least 3 MPa; it is less than 12 MPa and preferably less than 10 MPa. The quantity of hydrogen is a minimum of 100 liters of hydrogen per liter of feed and usually in the range 200 to 3000 liters of hydrogen per liter of feed. The hourly space velocity is generally in the range 0.15 to 10 $h^{-1}$. Under these conditions, the catalysts of the present invention have better activities for conversion, hydrodesulphuration, and hydrodenitrogenation and a better selectivity for middle distillates than commercially available catalysts. The service life of the catalysts is also improved in the moderate pressure range.

In a further implementation, the catalyst of the present invention can be used for hydrocracking under high hydrogen pressure conditions of at least 5 MPa. The treated cuts are, for example, vacuum distillates containing high sulphur and nitrogen contents which have already been hydrotreated. In this hydrocracking mode, the degree of conversion is over 55%. In this case, the petroleum cut conversion process is carried out in two steps, the catalyst of the invention being used in the second step.

The catalyst of the first step has a hydrotreatment function and comprises a matrix, preferably alumina-based, preferably containing no zeolite, and at least one metal with a hydrogenating function. Said matrix can also be constituted by, or comprise, a silica, silica-alumina, boron oxide, magnesia, zirconia, titanium oxide or a combination of these oxides. The hydro-dehydrogenating function is ensured by at least one group VIII metal or metal compound such as nickel or cobalt. A combination of at least one metal or metal compound from group VI (for example molybdenum or tungsten) and at least one metal or metal compound from group VIII (for example cobalt or nickel) can be used. The total concentration of groups VI and VIII metal oxides is in the range 5% to 40% by weight, preferably in the range 7% to 30% by weight, and the weight ratio, expressed as the metal oxide of the group VI metal (or metals) to that of the group VIII metal (or metals) is preferably in the range 1.25 to 20, more preferably in the range 2 to 10. Further, this catalyst can contain phosphorous. The phosphorous content, expressed as the concentration of phosphorous pentoxide $P_2O_5$, is at most 15%, preferably in the range 0.1% to 15% by weight, and more preferably in the range 0.15% to 10% by weight. It can also contain boron in a ratio B/P=1.02–2 (atomic), the sum of the B and P contents, expressed as the oxides, preferably being in the range 5% to 15% by weight.

The first step is generally carried out at a temperature of 350–460° C., preferably 360–450° C.; the pressure is over 2 MPa, preferably at least 3 MPa; the hourly space velocity is 0.1–5 $h^{-1}$, preferably 0.2–2 $h^{-1}$; and the quantity of hydrogen is at least 100 liters of hydrogen per liter of feed, preferably 260–3000 liters of hydrogen per liter of feed.

For the conversion step using the catalyst of the invention (or second step), the temperatures are generally 230° C. or more, usually in the range 300° C. to 480° C., preferably in the range 300° C. to 440° C. The pressure is generally over 5 MPa, preferably over 7 MPa. The quantity of hydrogen is a minimum of 100 liters of hydrogen per liter of feed, usually in the range 200 to 3000 liters of hydrogen per liter of hydrogen per liter of feed. The hourly space velocity is generally in the range 0.15 to 10 $h^{-1}$ Under these conditions, the catalysts of the present invention have better activities for conversion than commercially available catalysts, even with considerably lower zeolite contents than those of commercially available catalysts.

The following examples illustrate the present invention without in any way limiting its scope.

EXAMPLE 1: Preparation of a Hydrocracking Catalyst Support Containing a NU-88 Zeolite NU-88 zeolite was synthesized from hexane-1,6-bis (methylpyrrolidinium) bromide (HexPyrr). The structure of hexane-1,6-bis (methylpyrrolidinium) bromide (HexPyrr) is as follows:

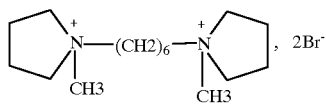

A reaction mixture with molar composition:

60 $SiO_2$: 2 $Al_2O_3$: 10 $Na_2O$; 10 HexPyrr: 3000 $H_2O$ was prepared from:
48.07 g of "CAB-O-SEL" (BDH Ltd);
12.303 g of SoAl 235 solution (Laroche) (composition in weight %: 22.10% $Al_2O_3$; 20.40% $Na_2O$; 57.50% $H_2O$);
7.4 g of sodium hydroxide pellets;
57.2 g of HexPyrr (composition in weight %: 96.50% HexPyrr; 3.50% $H_2O$)
709 g of water.

The mixture was prepared using the following method:
A—solution of the sodium hydroxide and the sodium aluminate in water (approximately 200 g);
B—solution of the HexPyrr in water (approximately 150 g);
C—dispersion of the CAB-O-SIL in the remaining water.

Solution A was added to dispersion C with stirring; solution B was then added. Stirring was continued until a homogeneous gel was obtained. The mixture obtained was then transferred to a stainless steel autoclave with a 1 liter capacity. The mixture was heated to a temperature of 160° C. This temperature was maintained during the entire reaction period. The mixture was stirred using an inclined paddle stirrer.

Samples of the reaction mixture were regularly removed and the progress of the reaction was followed by monitoring the pH. After 13 days at 160° C., the temperature of the reaction mixture was rapidly reduced to room temperature and the product was evacuated. The substance was then filtered; the solid product obtained was washed with demineralized water and dried for several hours at Analysis of the Si, Al and Na in the product was carried out using atomic emission spectroscopy. The following molar composition was determined:

100 $SiO_2$; 4.82 $Al_2O_3$; 0.337 $Na_2O$.

The dried solid product was analysed by powder X ray diffraction and identified as NU-88 zeolite. The diagram obtained agreed with the results shown in Table 1. The diffractogram is shown in FIG. 1 [with the intensity I (arbitrary units) up the ordinate and 2θ (Cu K alpha) along the abscissa].

The product obtained above was calcined in nitrogen for 24 hours at 550° C.; this step was immediately followed by a second calcining step in air at 450° C., for 24 hours.

The substance obtained was then left in contact with an aqueous 1 mole solution of ammonium chloride for 2 hours at room temperature using 50 ml of solution per gram of calcined solid product. The substance was then filtered, washed with deionized water and dried at 110° C. This treatment was repeated three times. The substance was calcined in air for 24 hours at 550° C. The calcined product was analysed by X ray diffraction. The diffractogram obtained is shown in FIG. 2 [2θ (CuK alpha) along the abscissa and intensity I up the ordinate (arbitrary units)]. The X ray diffraction diagram was in agreement with Table 2.

Atomic emission spectroscopic analysis of the Si, Al and Na in the product gave the following molar composition:

100 $SiO_2$: 4.55 $Al_2O_3$: 0.009 $Na_2O$

A hydrocracking catalyst support containing NU-88 zeolite produced as above was obtained as follows. 19.4 g of NU-88 zeolite was mixed with 80.6 g of a matrix composed of ultrafine tabular boehmite or alumina gel sold by Condea Chemie GmbH under the trade name SB3. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were then dried overnight at 120° C. in air and calcined at 550° C. in air.

EXAMPLE 2: Preparation of Hydrocracking Catalysts Containing a NU-88 Zeolite (in Accordance with the Invention)

Extrudates of the support containing a NU-88 zeolite prepared in Example 1 were dry impregnated with an aqueous solution of ammonium heptamolybdate and nickel nitrate, dried overnight at 120° C. and finally calcined at 550° C. in air. The oxide weight contents of catalyst CZ10 obtained are shown in Table 2.

The extrudates were dry impregnated with an aqueous solution of ammonium heptamolybdate, nickel nitrate and orthophosphoric acid, dried overnight at 120° C. and finally calcined at 550° C. in air. The oxide weight contents of catalyst CZ10P obtained are shown in Table 2.

We then impregnated the CZ10P catalyst sample with an aqueous solution containing ammonium biborate and Rhodorsil EP1 silicone emulsion and obtained catalyst CZ10PBSi. The final oxide weight contents of the CZ10 catalysts are shown in Table 2.

TABLE 2

Characteristics of CZ10 catalysts

| Catalyst | CZ10 | CZ10Nb | CZ10P | CZ10NbP | CZ10PBSi | CZ10NbPBSi |
|---|---|---|---|---|---|---|
| $MoO_3$ (wt %) | 13.8 | 12.9 | 13.3 | 12.3 | 12.8 | 11.9 |
| $Nb_2O_5$ (wt %) | 0 | 6.4 | 0 | 6.6 | 0 | 6.6 |
| NiO (wt %) | 3.1 | 2.9 | 3.0 | 2.8 | 2.9 | 2.7 |
| $P_2O_5$ (wt %) | 0 | 0 | 4.65 | 4.3 | 4.5 | 4.2 |
| $B_2O_3$ (wt %) | 0 | 0 | 0 | 0 | 1.5 | 1.4 |
| $SiO_2$ (wt %) | 14.8 | 13.8 | 14.1 | 13.1 | 15.3 | 14.3 |
| Complement to 100% mainly composed of $Al_2O_3$ (wt %) | 68.3 | 63.8 | 64.95 | 60.7 | 63.0 | 58.8 |

Electronic microprobe analysis of catalysts CZ10PBSi and CZ10NbPBSi (Table 2) showed that the silicon added to the catalyst of the invention was mainly located on the matrix and was in the form of amorphous silica.

EXAMPLE 3: Preparation of Hydrocracking Catalysts Containing a NU-88 Zeolite and Niobium (in Accordance with the Invention)

The catalysts of Example 3 above were impregnated using an aqueous solution of niobium oxalate $Nb(HC_2O_4)_5$, oxalic acid and ammonium oxalate. The aqueous solution containing the niobium was prepared from 1330 ml of water in which 33 g of oxalic acid, 37.2 g of ammonium oxalate and 92.3 g of niobium oxalate had been dissolved. This deposited about 5% by weight of Nb on the catalyst. The solution was prepared by first dissolving the mixture of oxalic acid and ammonium oxalate and when the solution was clear, heating the solution to 55° C. and adding the niobium oxalate. Water was then added to obtain 1330 ml of solution.

The catalysts of Example 3 were impregnated using the excess solution method. The 1330 ml of solution was brought into contact with 380 g of catalyst. After two hours, the extrudates were recovered. These were dried overnight at 120° C. in a stream of dry air. The final oxide contents of catalysts CZ10Nb, CZ10NbP and CZ10NbPBSi obtained are shown in Table 2.

EXAMPLE 4: Comparison of Catalysts for Partial Conversion Hydrocracking of a Vacuum Gas Oil The catalysts prepared in Examples 1 to 3 above were employed under moderate pressure hydrocracking conditions using a petroleum feed with the following principal characteristics:

| Density (20/4) | 0.921 |
|---|---|
| Sulphur (weight %) | 2.46 |
| Nitrogen (ppm by weight) | 1130 |
| Simulated distillation | |
| Initial point | 365° C. |
| 10% point | 430° C. |

-continued

| 50% point | 472° C. |
|---|---|
| 90% point | 504° C. |
| End point | 539° C. |
| Pour point | +39° C. |

The catalytic test unit comprised two fixed bed reactors in upflow mode. The catalyst for the first hydrotreatment step of the process, HTH548 from Procatalyse, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| Total pressure | 5 MPa |
|---|---|
| Hydrotreatment catalyst | 40 $cm^3$ |
| Hydrocracking catalyst | 40 $cm^3$ |
| Temperature | 400° C. |
| Hydrogen flow rate | 20 l/h |
| Feed flow rate | 40 $cm^3$/h |

The two catalysts underwent in-situ sulphurisation before the reaction. It should be noted that any in-situ or ex-situ sulphurisation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C.$^{minus}$ of effluent.

380° C.$^{minus}$ represents the fraction distilled at a temperature of 380° C. or less.

The gross selectivity GS for middle distillates is taken to be:

GS=100* weight of (150° C.–380° C.) fraction/weight of 380° C.$^{minus}$ fraction of effluent.

The hydrodesulphuration conversion HDS is taken to be:

HDS=($S_{initial}$-$S_{effluent}$)/$S_{initial}$*100=(24600-$S_{effluent}$)/24600 * 100

The hydrodenitrogenation conversion HDN is taken to be:

HDN=($N_{initial}$-$N_{Effluent}$)/$N_{initial}$ * 100=(1130-$N_{effluent}$)/1130 * 100

The following table shows the gross conversion GC at 400° C., the gross selectivity GS, the hydrodesulphuration conversion HDS and the hydrodenitrogenation conversion HDN for the catalysts.

TABLE 3

Catalytic activities of catalysts for partial hydrocracking at 400° C.

| | | GC (wt %) | GS (%) | HDS (%) | HDN (%) |
|---|---|---|---|---|---|
| CZ10 | NiMo/NU-88 | 49.7 | 59.2 | 98.7 | 95.1 |
| CZ10Nb | NiMoNb/NU-88 | 50.2 | 59.8 | 98.8 | 96.7 |
| CZ10P | NiMoP/NU-88 | 49.7 | 60.3 | 99.3 | 96.2 |
| CZ10NbP | NiMoNbP/NU-88 | 50.6 | 60.1 | 99.45 | 97.1 |
| CZ10PBSi | NiMoPBSi/NU-88 | 50.9 | 59.4 | 99.5 | 98.4 |
| CZ10NbPBSi | NiMoNbPBSi/NU-88 | 51.6 | 60.2 | 99.7 | 98.8 |

The results of Table 3 show that adding niobium to NiMo, NiMoP, NiMoPBSi catalysts supported on supports containing alumina and a NU-88 zeolite improved the performances of the catalyst whatever the zeolite. The activities of catalysts containing NU-88 zeolite of the invention were higher, i.e., the conversions were higher for the same reaction temperature of 400° C., than catalysts which were not in accordance with the invention (CZ10, CZ10P and CZ10PBSi). Catalysts of the invention containing niobium are thus of particular importance for partial hydrocracking of a vacuum distillate type feed containing nitrogen at medium hydrogen pressure.

EXAMPLE 5: Comparison of NU-88 Based Catalysts for High Conversion Hydrocracking of a Vacuum Gas Oil The catalysts containing NU-88 zeolite and niobium prepared as described in Examples 1 to 3 were used under high conversion (60–100%) hydrocracking conditions. The petroleum feed was a hydrotreated vacuum distillate with the following principal characteristics:

| | |
|---|---|
| Density (20/4) | 0.869 |
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VIB element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+ aniline mixture at 320° C. It should be noted that any in-situ or ex-situ sulphurisation method is suitable. Once sulphurisation had been carried out, the feed described above could be transformed. The operating conditions of the test unit were as follows:

| | |
|---|---|
| Total pressure | 9 MPa |
| Catalyst | 80 cm³ |
| Temperature | 360–420° C. |
| Hydrogen flow rate | 80 l/h |
| Feed flow rate | 80 cm³h |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100* weight of (150° C.–380° C.) fraction/weight of 380° C.$^{minus}$ fraction of effluent.

The (27–150) gasoline yield (hereinafter Gyld) was equal to the weight % of compounds with a boiling point in the range 27° C. to 150° C. in the effluents. The jet fuel yield (kerosine, 150–250) (hereinafter Kyld) was equal to the weight % of compounds with a boiling point in the range 150° C. to 250° C. in the effluents. The (250–380) gas oil yield was equal to the weight % of compounds with a boiling point in the range 250° C. to 380° C. in the effluents.

The reaction temperature was fixed so as to obtain a gross conversion GC of 70% by weight. Table 5 below shows the reaction temperature and gross selectivity for the catalysts described in Table 2.

Table 5 shows that using a catalyst of the invention containing NU-88 zeolite and niobium leads to higher conversions (i.e., lower conversion temperatures for a given conversion of 70% by weight) than catalysts which are not in accordance with the invention containing no niobium. Further, the gasoline and kerosine yields of all of the catalysts containing a NU-88 zeolite and niobium of the invention were improved over those recorded for prior art catalysts containing no niobium.

TABLE 5

Catalytic activities of catalysts for high conversion (70%) hydrocracking

|  |  | T (° C.) | Gasoline yield (wt %) | Kerosine yield (wt %) |
|---|---|---|---|---|
| CZ10 | NiMo/NU-88 | 373 | 37.4 | 12.0 |
| CZ10Nb | NiMoNb/NU-88 | 371 | 38.2 | 11.4 |
| CZ10P | NiMoP/NU-88 | 373 | 37.4 | 12.9 |
| CZ10NbP | NiMoNbP/NU-88 | 371 | 38.4 | 12.2 |
| CZ10PBSi | NiMoPBSi/NU-88 | 370 | 36.6 | 12.9 |
| CZ10NbPBSi | NiMoNbPBSi/NU-88 | 368 | 37.9 | 12.4 |

What is claimed is:

1. A catalyst comprising at least one matrix, at least one group VB element, with the proviso the group VB element is not vanadium, and at least one NU-88 zeolite having:

i) a chemical composition with the following formula, expressed in terms of the mole ratios of the oxides for the anhydrous state:

$$100 \times O_2, mY_2O_3, pR_{2/n}O$$

where
   m is 10 or less;
   p is 20 or less;
   R represents one or more cations with valence n;
   X represents silicon and/or germanium;
   Y is aluminum, iron, gallium, boron, titanium, vanadium, zirconium, molybdenum, arsenic, antimony, chromium or manganese; and ii) an X ray diffraction diagram, in its as synthesized state, shown in Table 1:

TABLE 1

X ray diffraction diagram for NU-88 zeolite (as synthesised state)

| $d_{hkl}$ ($10^{-10}$ m) | $I/I_{max}$ |
|---|---|
| 12.1 ± 0.35 | s or vs (1) |
| 11.0 ± 0.30 | s (1) |
| 9.88 ± 0.25 | m (1) |
| 6.17 ± 0.15 | w |
| 3.97 ± 0.09 | vs (2) |
| 3.90 ± 0.08 | vs (2) |
| 3.80 ± 0.08 | w (2) |
| 3.66 ± 0.07 | vw |
| 3.52 ± 0.07 | vw |
| 3.27 ± 0.07 | vw |
| 3.09 ± 0.06 | w |
| 2.91 ± 0.06 | w |
| 2.68 ± 0.06 | vw |
| 2.49 ± 0.05 | vw |
| 2.20 ± 0.05 | vw |
| 2.059 ± 0.05 | w |
| 1.729 ± 0.04 | vw |

(1) these peaks were not resolved and formed part of a feature;
(2) these peaks were not resolved and formed part of the same feature.

2. A catalyst according to claim 1, in which the value m for the zeolite is 0.1 to 10.

3. A catalyst according to claim 1, in which the zeolite has the following chemical composition, expressed in terms of the mole ratios of the oxides for the anhydrous state:

$$100 \times O_2, 10 \text{ or less } Y_2O_3, 10 \text{ or less } Q; 10 \text{ or less } M_2O;$$

where

X represents silicon and/or germanium;
Y is aluminium, iron, gallium, boron, titanium, vanadium, zirconium, molybdenum, arsenic, antimony, chromium or manganese; and
M is at least one cation of an alkali metal and/or ammonium and/or hydrogen; and
Q is at least one nitrogen-containing organic cation or a precursor of a nitrogen-containing organic cation or a decomposition product of a nitrogen-containing organic cation.

4. A catalyst according to a claim 3, comprising, in weight % with respect to the total catalyst mass:

0.1% to 99.8% of a NU-88 zeolite;
0.1% to 60% of a least one group VB metal, with the proviso the group VB metal is not vanadium;
0.1% to 99% of an amorphous or low crystallinity oxide type porous mineral matrix;
0 to 60% of at least one group VIII or group VIB metal;
0 to 20% of at least one silicon, boron or phosphorous promoter element other than silicon contained in the zeolite framework;
0 to 20% of at least one group VIIA element.

5. A method of preparing a catalyst according to claim 3, comprising:

a) drying and weighing an optionally formed solid precursor comprising at least one matrix, at least one NU-88 zeolite, optionally at least one group VIB or group VIII element, optionally at least one of phosphorous, boron or silicon, and optionally at least one group VIIA element;

b) calcining a dry solid obtained in a) at a temperature of at least 150° C.;

c) impregnating a solid precursor defined in b) with a solution containing a group VB element, with the proviso the group VB element is not vanadium;

d) leaving a moist solid from c) in a moist atmosphere at a temperature of 10° C. to 120° C.;

e) drying the moist solid obtained in d) at a temperature of 60° C. to 150° C.

6. A catalyst according to claim 1, in which the zeolite is at least partially in the H+ or NH4+ form or metal form, said metal being one of group IA, IB, IIA, IIB, IIIA, IIIB, VIII, Sn, Pb, Si or a rare earth.

7. A catalyst according to claim 1, further comprising at least one boron, silicon and phosphorous promoter element.

8. A catalyst according to claim 1, further comprising at least one group VIB element.

9. A catalyst according to claim 8, in which the group VIB element is molybdenum or tungsten.

10. A catalyst according to claim 1, further comprising at least one group VIII promoter element.

11. A catalyst according to claim 10, in which the group VIII element is iron, cobalt or nickel.

12. A catalyst according to claim 1, further comprising at least one group VIIA element.

13. A catalyst according to claim 12, in which the group VIIA element is fluorine.

14. A catalyst according to claim 1, comprising, in weight % with respect to the total catalyst mass:

0.1% to 99.8% of a NU-88 zeolite;
0.1% to 60% of at least one metal selected from group VB, with the proviso that the group VB metal is not vanadium;
0.1% to 99% of an amorphous or low crystallinity oxide type porous mineral matrix;

0 to 60% of at least one group VIII or group VIB metal;

0 to 20% of at least one boron, silicon or phosphorous promoter element, not including silicon contained in the zeolite framework;

0 to 20% of at least one group VIIA element.

15. A method of preparing a catalyst according to claim 1, comprising:
   a) drying and weighting an optionally formed solid precursor, comprising at least one matrix, at least one NU-88 zeolite, optionally at least one group VIB or group VIII element, optionally at least phosphorous, boron or silicon, and optionally at least one group VIIA element;
   b) calcining a dry solid obtained in a) at a temperature of at least 150° C.;
   c) impregnating a solid precursor in b) with a solution containing a group VB element, with the proviso the group VB element is not vanadium;
   d) leaving a moist solid from c) in a moist atmosphere at a temperature of 10° C. to 120° C.;
   e) drying the moist solid obtained in d) at a temperature of 60° C. to 150° C.

16. A preparation method according to claim 15, wherein at least one group VIII or group VIB element is introduced into a mixture of at least one at least one NU-88 zeolite at any one of a) to e), before or after forming and before or after calcining said mixture.

17. A preparation method according to claim 15, wherein the catalyst is impregnated with at least one solution containing at least one group VIB or group VIII element.

18. A preparation method according to claim 15, wherein the catalyst is impregnated with at least one solution containing at least one boron, silicon or phosphorous promoter element.

19. A preparation method according to claim 15, wherein the catalyst is impregnated with at least one solution containing at least one group VIIA element.

20. A preparation method according to claim 15, wherein at least one calcining step is carried out after a), b), c), d) or e), at a temperature of at least 150° C.

21. A preparation method according to claim 15, wherein the catalyst is sulfurized in a stream of a hydrogen/hydrogen sulfide mixture, a nitrogen/hydrogen sulfide mixture or in pure hydrogen sulfide, at a temperature of 150° to 800° C.

22. In a process for hydrocracking hydrocarbon-containing feeds, comprising subjecting a hydrocarbon-containing feed to hydrocracking conditions in the presence of a catalyst, the improvement wherein the catalyst is one according to claim 3.

23. A catalyst comprising at least one matrix, at least one group VB element, with the proviso the group VB element is not vanadium, and at least one NU-88 zeolite defined as follows:
   1) a chemical composition with the following formula, expressed in terms of the mole ratios of the oxides for the anhydrous state:

100×O$_2$, 10 or less Y$_2$O$_3$, 10 or less M$_2$O;

where
      X represents silicon and/or germanium;
      Y is aluminum, iron, gallium, boron, titanium, vanadium, zirconium, molybdenum, arsenic, antimony, chromium or manganese; and
      M is at least one cation of an alkali metal and/or ammonium and/or hydrogen;
   ii) an X ray diffraction diagram, in its hydrogen form, which comprises the results shown in Table 2:

TABLE 2

X ray diffraction diagram for NU-88 zeolite (hydrogen form)

| $d_{hkl}$ ($10^{-10}$ m) | $I/I_{max}$ |
|---|---|
| 12.1 ± 0.35 | vs (1) |
| 11.0 ± 0.30 | s or vs (1) |
| 9.92 ± 0.25 | w or m (1) |
| 8.83 ± 0.20 | vw |
| 6.17 ± 0.15 | w |
| 3.99 ± 0.10 | s or vs (2) |
| 3.91 ± 0.08 | vs (2) |
| 3.79 ± 0.08 | w or m (2) |
| 3.67 ± 0.07 | vw |
| 3.52 ± 0.07 | vw |
| 3.09 ± 0.06 | w |
| 2.90 ± 0.06 | w |
| 2.48 ± 0.05 | w |
| 2.065 ± 0.05 | w |
| 1.885 ± 0.04 | vw |
| 1.733 ± 0.04 | vw |

(1) these peaks were not resolved and formed part of a feature;
(2) these peaks were not resolved and formed part of the same feature.

24. A catalyst according to claim 23, in which X is silicon and Y is aluminium.

25. A catalyst according to claim 23, in which the group VB element is niobium.

26. In a process for hydrocracking hydrocarbon-containing feeds, comprising subjecting a hydrocarbon-containing feed to hydrocracking conditions in the presence of a catalyst, the improvement wherein the catalyst is one according to claim 23.

27. In a process for hydrocracking hydrocarbon-containing feeds, comprising subjecting a hydrocarbon-containing feed to hydrocracking conditions in the presence of a catalyst, the improvement wherein the catalyst is one according to claim 1.

28. A process according to claim 27, in which the feed contains at least 80% by volume of compounds with a boiling point of at least 350° C.

29. Use according to claim 27, in which the temperature is over 200° C., the pressure is over 0.1 MPa, the quantity of hydrogen is a minimum of 50 liters of hydrogen per liter of feed, and the hourly space velocity is in the range 0.1 to 20 volumes of feed per volume of catalyst per hour.

30. A process according to claim 27, comprising a mild hydrocracking process in which the degree of conversion is less than 55%, the temperature is over 230° C., the pressure is over 2 MPa and less than 12 MPa, the quantity of hydrogen is a minimum of 100 liters of hydrogen per liter of feed, and the hourly space velocity is in the range 0.15 to 10 volumes of feed per volume of catalyst per hour.

31. A process according to claim 27, comprising a mild hydrocracking process in which the degree of conversion is over 55%, the temperature is over 230° C., the pressure is over 5 NPa, the quantity of hydrogen is a minimum of 100 liters of hydrogen per liter of feed, and the hourly space velocity is in the range 0.15 to 10 volumes of feed per volume of catalyst per hour.

32. Use according to claim 27, in which a hydrotreatment step is carried out prior to the hydrocracking step.

33. A process according to claim 32, in which the hydrotreatment step is carried out at a temperature in the range 350° C. to 460° C., a pressure of at least 2 MPa, with a quantity of hydrogen of at least 100 liters of hydrogen per liter of feed, and an hourly space velocity in the range 0.1 to 5 volumes of feed per volume of catalyst per hour.

* * * * *